(12) United States Patent
Bech-Lisberg et al.

(10) Patent No.: US 12,680,280 B2
(45) Date of Patent: Jul. 14, 2026

(54) CIRCULATION PUMP, SYSTEM AND METHOD FOR DOMESTIC HOT-WATER RECIRCULATION

(71) Applicant: Grundfos Holding A/S, Bjerringbro (DK)

(72) Inventors: Ole Bech-Lisberg, Bjerringbro (DK); Mathias Skødt Larsen, Bjerringbro (DK); Jesper Vorgod Laursen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 199 days.

(21) Appl. No.: 18/244,447

(22) Filed: Sep. 11, 2023

(65) Prior Publication Data

US 2025/0084999 A1     Mar. 13, 2025

(51) Int. Cl.
| | |
|---|---|
| *E03B 7/04* | (2006.01) |
| *F24D 17/00* | (2022.01) |
| *F24D 19/00* | (2006.01) |
| *F24D 19/10* | (2006.01) |
| *F24H 15/212* | (2022.01) |
| *F24H 15/335* | (2022.01) |
| *F24H 15/429* | (2022.01) |
| *F24H 15/436* | (2022.01) |
| *G05D 7/06* | (2006.01) |
| *G05D 23/02* | (2006.01) |

(52) U.S. Cl.
CPC .......... *E03B 7/045* (2013.01); *F24D 17/0078* (2013.01); *F24D 19/0092* (2013.01); *F24D 19/0095* (2013.01); *F24D 19/1051* (2013.01); *F24H 15/212* (2022.01); *F24H 15/335* (2022.01); *F24H 15/429* (2022.01); *F24H 15/436* (2022.01); *G05D 7/0676* (2013.01); *G05D 23/02* (2013.01)

(58) Field of Classification Search
CPC ............. F24D 17/0078; F24D 19/0092; F24D 19/0095; F24D 2220/0207; E03B 7/045; F24H 15/335; F24H 15/212; F24H 15/429; F24H 15/436
See application file for complete search history.

(56) References Cited

U.S. PATENT DOCUMENTS

| | | |
|---|---|---|
| 2,842,155 A | 7/1958 | Peters |
| 5,119,988 A | 6/1992 | Fiedrich |
| 5,209,401 A | 5/1993 | Fiedrich |
| 5,287,570 A | 2/1994 | Peterson et al. |

(Continued)

*Primary Examiner* — Atif H Chaudry
(74) *Attorney, Agent, or Firm* — Panitch Schwarze Belisario & Nadel LLP

(57) ABSTRACT

A circulation pump for supplying hot water to a hot water inlet of a temperature-controlled bypass valve for domestic hot-water recirculation, the circulation pump including a pump controller configured for controlling a pump motor such that the pump motor cycles between on-phases and off-phases, the circulation pump further including a sensor for measuring at least one operation parameter of the circulation pump; the pump controller being configured such that an on-phase is terminated and an off-phase is initiated when an output signal of the sensor indicates that said at least one operation parameter reaches a termination threshold value or range.

21 Claims, 3 Drawing Sheets

(56)          References Cited

U.S. PATENT DOCUMENTS

| | | | |
|---|---|---|---|
| 5,572,985 | A | 11/1996 | Benham |
| 5,623,990 | A | 4/1997 | Pirkle |
| 5,829,467 | A * | 11/1998 | Spicher ............... F24D 19/1051 |
| | | | 137/563 |
| 6,536,464 | B1 | 3/2003 | Lum et al. |
| 2013/0180611 | A1* | 7/2013 | Lum ...................... E03B 7/045 |
| | | | 137/625.4 |

* cited by examiner

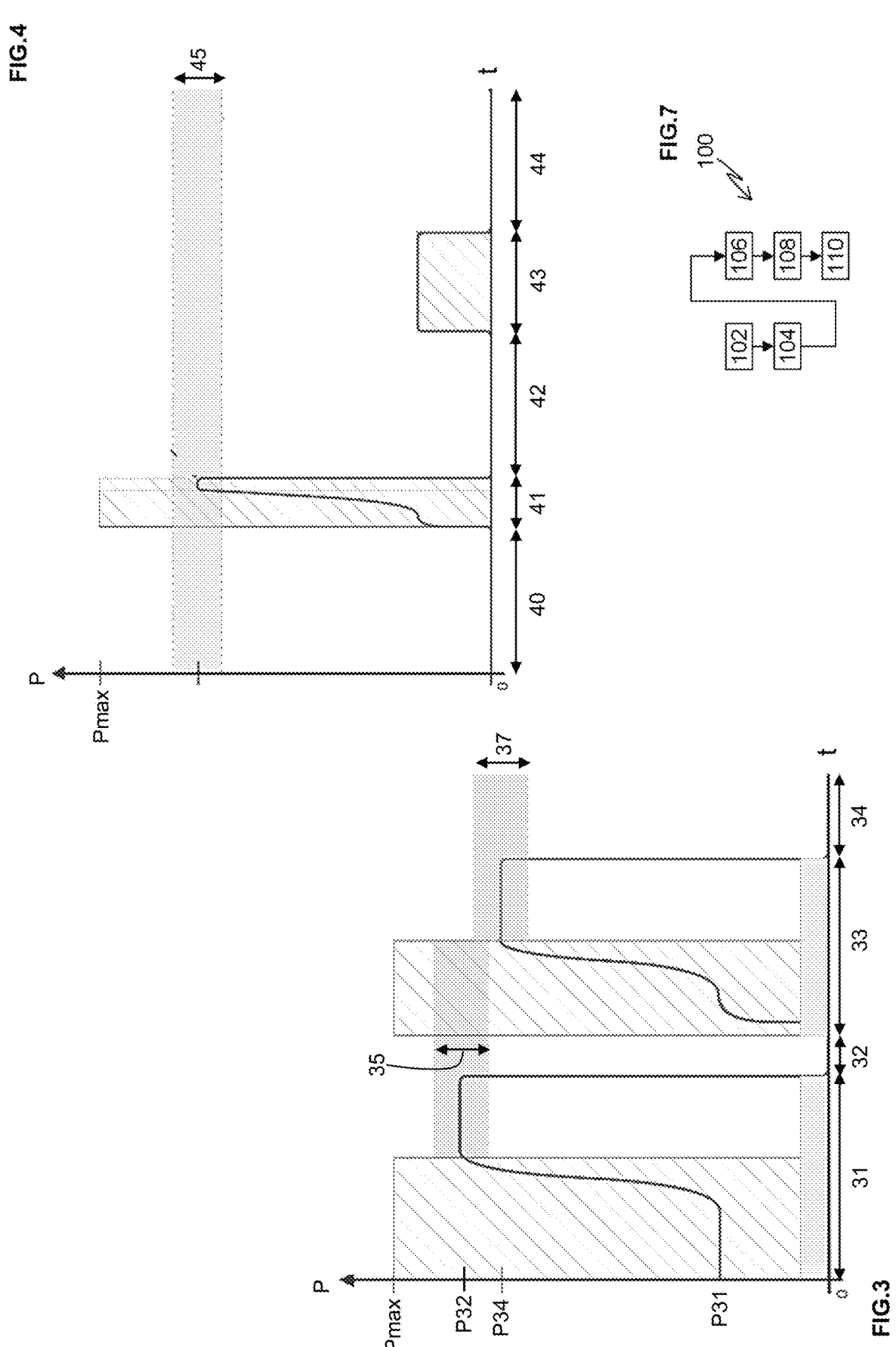

CIRCULATION PUMP, SYSTEM AND METHOD FOR DOMESTIC HOT-WATER RECIRCULATION

FIELD

The present disclosure is in the field of domestic water installations, and especially in the area of hot water-recirculation e.g. for sinks equipped with a comfort system.

BACKGROUND

As explained in U.S. Pat. No. 6,536,464 B1 to GRUND-FOS, home and industrial water distribution systems distribute water to various fixtures, including sinks, bathtubs, showers, dishwashers and washing machines that are located throughout the house or industrial building. The typical water distribution system brings water in from an external source, such as a city main water line or a private water well, to the internal water distribution piping system. The water from the external source is typically either at a cold or cool temperature. One segment of the piping system takes this incoming cold water and distributes it to the various cold water connections located at the fixture where it will be used (i.e., the cold water side of the faucet at the kitchen sink). Another segment of the piping system delivers the incoming cold water to a water heater which heats the water to the desired temperature and distributes it to the various hot water connections where it will be used (i.e., the hot water side of the kitchen faucet). At the fixture, cold and hot water either flow through separate hot and cold water control valves that are independently operated to control the temperature of the water into the fixture by controlling the flow rate of water from the valves or the water is mixed at a single valve that selectively controls the desired temperature flowing into the fixture.

A well-known problem common to most home and industrial water distribution systems is that hot water is not always readily available at the hot water side of the fixture when it is desired. This problem is particularly acute in water use fixtures that are located a distance from the hot water heater or in systems with poorly insulated pipes. When the hot water side of these fixtures is left closed for some time (i.e., overnight), the hot water in the hot water segment of the piping system sits in the pipes and cools. As a result, the temperature of the water between the hot water heater and the fixture lowers until it becomes cold or at least tepid. When opened again, it is not at all uncommon for the hot water side of such a fixture to supply cold water through the hot water valve when it is first opened and for some time thereafter. At the sink, bathtub or shower fixture located away from the water heater, the person desiring to use the fixture will either have to use cold or tepid water instead of hot water or wait for the distribution system to supply hot water through the open hot water valve. Most users have learned that to obtain the desired hot water, the hot water valve must be opened and left open for some time so that the cool water in the hot water side of the piping system will flow out ahead of the hot water. For certain fixtures, such as dishwashers and washing machines, there typically is no method of "draining" away the cold or tepid water in the hot water pipes prior to utilizing the water in the fixture.

The inability to have hot water at the hot water side of the fixture when it is desired creates a number of problems. One problem is having to utilize cold or tepid water when hot water is desired. This is a particular problem for the dishwasher and washing machine fixtures in that hot water is often desired for improved operation of those fixtures. As is well known, certain dirty dishes and clothes are much easier to clean in hot water as opposed to cold or tepid water. Even in those fixtures where the person can let the cold or tepid water flow out of the fixture until it reaches the desired warm or hot temperature, there are certain problems associated with such a solution. One such problem is the waste of water that flows out of the fixture through the drain and, typically, to the sewage system. This good and clean water is wasted (resulting in unnecessary water treatment after flowing through the sewage system). This waste of water is compounded when the person is inattentive and hot water begins flowing down the drain and to the sewage system. Yet another problem associated with the inability to have hot water at the hot water valve when needed is the waste of time for the person who must wait for the water to reach the desired temperature.

The use of bypass valves and/or water recirculation systems in home or industrial water distribution systems to overcome the problems described above have been known for some time. The objective of the bypass valve or recirculation system is to avoid supplying cold or tepid water at the hot water side of the piping system. U.S. Pat. No. 2,842,155 to Peters describes a thermostatically controlled water bypass valve, shown as FIG. 2 therein, that connects at or near the fixture located away from the water heater. In his patent, the inventor discusses the lack of hot water problem and describes a number of prior art attempts to solve the problem. The bypass valve in this patent comprises a cylindrical housing having threaded ends that connect to the hot and cold water piping at the fixture so as to interconnect these piping segments. Inside the housing at the hot water side is a temperature responsive element having a valve ball at one end that can sealably abut a valve seat. The temperature responsive element is a metallic bellows that extends when it is heated to close the valve ball against the valve seat and contracts when cooled to allow water to flow from the hot side to the cold side of the piping system when both the hot and cold water valves are closed. Inside the housing at the cold water side is a dual action check valve that prevents cold water from flowing to the hot water side of the piping system when the hot water valve or the cold water valve is open. An alternative embodiment of Peters' patent shows the use of a spiral temperature responsive element having a finger portion that moves left or right to close or open the valve between the hot and cold water piping segments. Although Peters' patent relies on gravity or convection flow, similar systems utilizing pumps to cause a positive circulation are increasingly known. These pumps are typically placed in the hot water line in close proximity to the faucet where "instant" hot water is desired.

U.S. Pat. No. 5,623,990 to Pirkle describes a temperature-controlled water delivery system for use with showers and eye-wash apparatuses that utilize a pair of temperature responsive valves, shown as FIGS. 2 and 5 therein. These valves utilize thermally responsive wax actuators that push valve elements against springs to open or close the valves to allow fluid of certain temperatures to pass. U.S. Pat. No. 5,209,401 to Fiedrich describes a diverting valve for hydronic heating systems, best shown in FIGS. 3 through 5, that is used in conjunction with a thermostatic control head having a sensor bulb to detect the temperature of the supply water. U.S. Pat. No. 5,119,988 also to Fiedrich describes a three-way modulating diverting valve, shown as FIG. 6. A non-electric, thermostatic, automatic controller provides the force for the modulation of the valve stem against the spring. U.S. Pat. No. 5,287,570 to Peterson et al. discloses the use of a bypass valve located below a sink to divert cold water from the hot water faucet to the sewer or a water reservoir. As discussed with regard to FIG. 5, the bypass valve is used in conjunction with a separate temperature sensor.

A recirculating system for domestic and industrial hot water heating utilizing a bypass valve is disclosed in U.S. Pat. No. 5,572,985 to Benham. This system utilizes a circulating pump in the return line to the water heater and a temperature responsive or thermostatically actuated bypass valve disposed between the circulating pump and the hot water heater to maintain a return flow temperature at a level below that at the outlet from the water heater. The bypass valve, shown in FIG. 2, utilizes a thermostatic actuator that extends or retracts its stem portion, having a valve member at its end, to seat or unseat the valve. When the fluid temperature reaches the desired level, the valve is unseated so that fluid that normally circulates through the return line of the system is bypassed through the circulating pump.

Despite the devices and systems set forth above, many people still have problems with obtaining hot water at the hot water side of fixtures located away from the hot water heater or other source of hot water. Boosted, thermally actuated valve systems having valves that are directly operated by a thermal actuator (such as a wax filled cartridge) tend not to have any toggle action. Instead, after a few on-off cycles, the valves tend to just throttle the flow until the water reaches an equilibrium temperature, at which time the valve stays slightly cracked open. While this meets the primary function of keeping the water at a remote faucet hot, leaving the valve in a slightly open condition does present two problems. First, the lack of toggle action can result in lime being more likely to build up on the actuator because it is constantly extended. Second, the open valve constantly bleeds a small amount of hot or almost hot water into the cold water piping, thereby keeping the faucet end of the cold water pipe substantially warm. If truly cold water is desired (i.e., for brushing teeth, drinking, or making cold beverages), then some water must be wasted from the cold water faucet to drain out the warm water. If the bypass valve is equipped with a spring loaded check valve to prevent siphoning of cold water into the hot water side when only the hot water faucet is open, then the very small flow allowed through the throttled-down valve may cause chattering of the spring loaded check valve. The chattering can be avoided by using a free floating or non-spring loaded check valve. It is also detrimental to have any noticeable crossover flow (siphoning) from hot to cold or cold to hot with any combination of faucet positions, water temperatures, or pump operation.

U.S. Pat. No. 6,536,464 the disclosure of which is incorporated herein as fully set forth and having some of the same inventors and the same assignee as the present disclosure, describes an under-the-sink thermostatically controlled bypass valve and water circulating system with the bypass valve placed at or near a fixture (i.e., under the sink) to automatically bypass cold or tepid water away from the hot water side of the fixture until the temperature of the water reaches the desired level. The system described in U.S. Pat. No. 6,536,464 includes a single small circulating pump that is placed between the water heater and the first branching in the hot water supply line which supplies the fixture having a bypass valve so as to let hot water flow in the hot water piping system and facilitate bypassing of the cold or tepid water.

U.S. Pat. No. 6,536,464 B1 teaches that by using a time-of-day control timer, the circulation pump may operate to maintain instant hot water only during periods of the day when it is commonly desired. During the off-cycle times, the plumbing system operates just as if bypass valves and pump were not in place. This saves electrical power usage from pump operation and, more importantly, avoids the periodic introduction of hot water into relatively uninsulated pipes during the off-hours, thereby saving the cost of repeatedly reheating this water.

The disclosure is based on a system approach in which the bypass valve and the circulation pump supplying the hot end of the bypass valve, which might happen to be remote from one another, do not have to communicate with each other. On the other hand, there is a need to reduce unnecessary pumping operation when the bypass valve is not in its fully opened state and the pump is working against this increased flow resistance.

SUMMARY

A circulation pump for supplying hot water to a hot water inlet of a temperature-controlled bypass valve for domestic hot-water recirculation, the circulation pump comprising a pump controller configured for controlling a pump motor such that the pump motor cycles between on-phases and off-phases, the pump controller being configured to track at least one operation parameter of the circulation pump; and the pump controller being configured such that an on-phase is terminated and an off-phase is initiated when said at least one operation parameter reaches a termination threshold value or range.

According to an embodiment, the pump controller may be further configured for comparing said at least one operation parameter to said termination threshold value or range.

According to an embodiment, the pump controller may be configured to track the at least one operation parameter at least while the pump motor operates in the on-phases.

According to an embodiment, the termination threshold value or range may indicate that the bypass valve is substantially in a closed state.

According to an embodiment, the at least one operation parameter includes at least the electrical power consumption of the circulation pump or a parameter representative of or correlated with the electrical power consumption of the circulation pump.

According to an embodiment, the pump controller may be configured to track more than one operation parameter of the circulation pump, the pump controller being configured such that an on-phase is terminated and an off-phase is initiated when each operation parameter reaches a respective termination threshold value or range.

According to an embodiment, the pump controller may be configured to learn, in a learning state, the termination threshold value or range while the pump motor operates in the on-phases, and during an operating state occurring after the learning state, the pump controller terminates the on-phases and initiates the off-phases when said at least one operation parameter reaches the termination threshold value or range learnt during the learning state.

According to an embodiment, the learning state may be stopped upon fulfilling a stop criterion selected within the group consisting of.

the pump motor has operated at least 10 cycles,
the pump motor has operated at least for 10 days, and
the series of termination threshold values or ranges learnt is converging into a window smaller than or equal to a predetermined window.

According to an embodiment, the pump controller may be configured to initially store at least one of i) a duration of an off-phase ranging from 10 minutes to 20 minutes and ii) a duration of an on-phase of ranging from 1 minute to 10 minutes.

According to an embodiment, the pump controller may be configured to store and adjust at least one of i) the duration of an on-phase and ii) the duration of an off-phase.

According to an embodiment, the pump controller may be further configured to feedback-control the working speed of the pump motor or the outgoing flow rate of the circulation pump, a nominal value for said working speed or said flow rate being either adaptive or substantially identical in each on-phase.

According to an embodiment, the pump controller may feedback-control the working speed of the pump motor such that the outgoing flow rate of the circulation pump is substantially constant.

According to an embodiment, the circulation pump may be devoid of means for communicating with the bypass valve.

A system for domestic hot-water recirculation comprising:

a circulation pump for supplying hot water, and a temperature-controlled bypass valve having a hot water inlet fluidly connected to said circulation pump, at least one operation parameter of the circulation pump being tracked, the circulation pump further comprising a pump controller configured for controlling a pump motor such that the pump motor cycles between on-phases and off-phases, and the pump controller being configured for controlling the pump motor based on said at least one operation parameter and without communicating with the bypass valve.

According to an embodiment, the pump controller may be configured such that an on-phase is terminated and an off-phase is initiated when said at least one operation parameter reaches a termination threshold value or range According to an embodiment, the pump controller may be further configured to store and adjust at least one of i) the duration of the on-phase and ii) the duration of the off-phase.

According to an embodiment, the pump controller may be further configured to keep constant at least one of i) the duration of the on-phase and ii) the duration of the off-phase.

A method for operating a domestic hot-water recirculation system comprising a circulation pump and a temperature-controlled bypass valve, the bypass valve having a hot water inlet fluidly connected to said circulation pump, the circulation pump comprising a pump motor configured to cycle between on-phases and off-phases, the circulation pump further comprising a sensor for measuring at least one operation parameter of the circulation pump, the method comprising:

opening and closing the bypass valve based on a temperature of hot water at the hot water inlet, and controlling the pump motor to cycle between on-phases and off-phases based on said at least one operation parameter and without communication between the circulation pump and the bypass valve.

According to an embodiment, the circulation pump may further comprise a pump controller, the pump controller being configured such that an on-phase is terminated and an off-phase is initiated when said at least one operation parameter reaches a termination threshold value or range.

BRIEF DESCRIPTION OF THE DRAWINGS

In the drawings, which illustrate the best embodiments presently contemplated for carrying out the present disclosure:

FIG. 3 is a schematic power-time graph of the circulation pump of FIG. 1 showing a learning state a pump controller;

FIG. 4 is a schematic power-time graph of the circulation pump of FIG. 1 showing an operating state a pump controller;

FIG. 7 is a schematic flow diagram showing a method for operating the domestic hot-water recirculation system of FIG. 1.

DETAILED DESCRIPTION OF THE BEST EMBODIMENTS

Figures 1, 2:
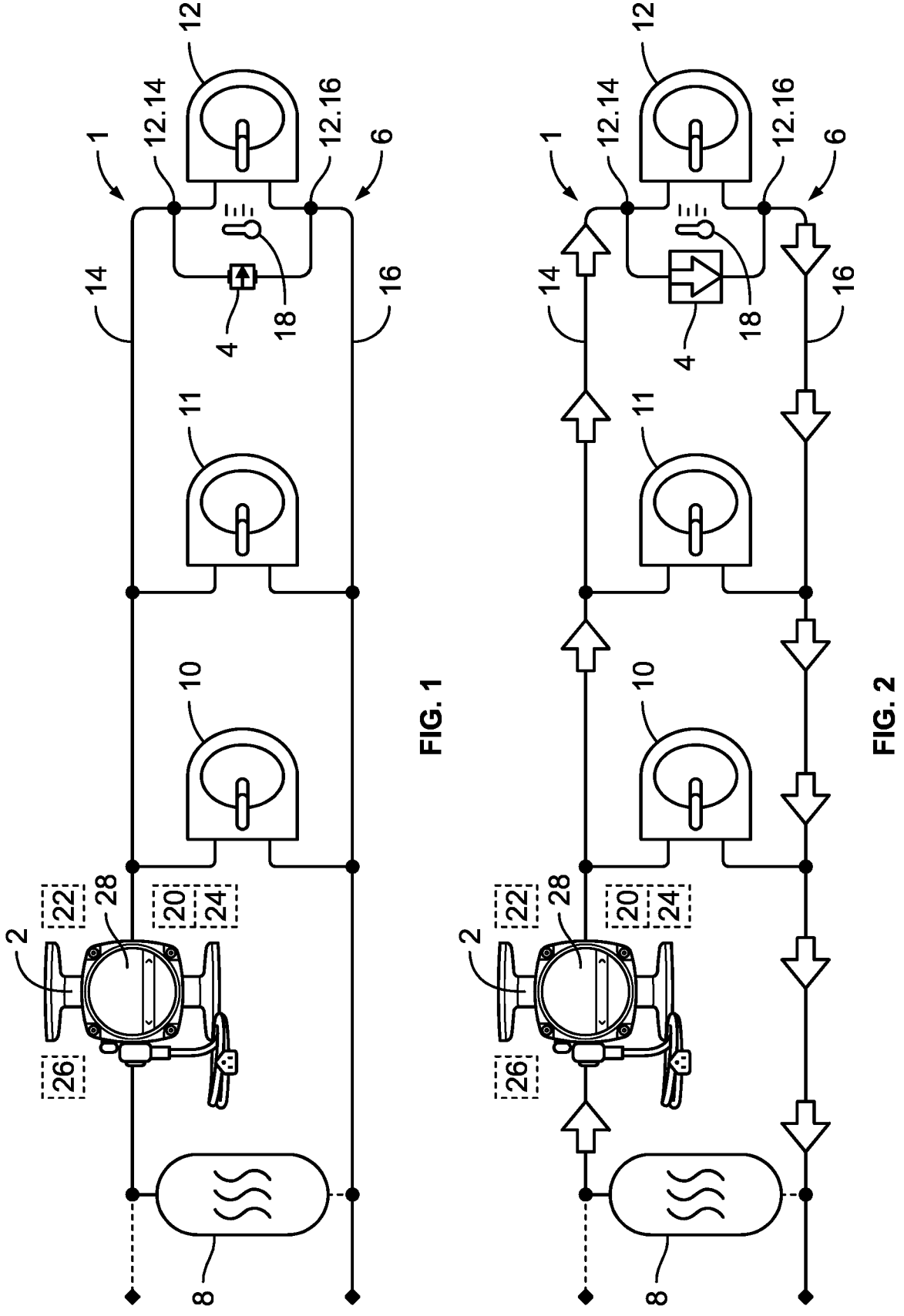
FIG. 1 is a schematic side elevation view showing a system for domestic hot-water recirculation according to the present disclosure, including a bypass valve in a closed state and a circulation pump according to the present disclosure.
FIG. 2 is a view similar to FIG. 1, wherein the bypass valve in an open state.

FIGS. 1-2 show a system 1 for domestic hot-water recirculation according to the present disclosure. The system 1 may have a structure similar to the one depicted in U.S. Pat. No. 6,536,464 B1 to GRUNDFOS (see e.g. its FIG. 7), the content of which is hereby incorporated by reference. According to the present disclosure the system 1 comprises a circulation pump 2 and a bypass valve 4 that is temperature-controlled. The bypass valve 4 is put in a closed state in FIG. 1 and in an open state in FIG. 2. The bypass valve 4 may be of the type Grundfos Comfort Valve.

The system 1 may be installed in a domestic hot water distribution installation 6, which may further comprise a heater and/or tank 8, some sinks 10, 11 and 12, a supply line 14 and a return line 16. The sinks 10, 11 and 12 may be manipulated by a user to trigger or stop a flow of hot water through the supply line 14 into the sink 10, 11 and/or 12.

The tank 8 may be configured to contain hot water and to heat up water if need be. The tank 8 may be connected to the supply line 14 such that hot water may be supplied from the tank 8 to the sinks 10, 11 and 12 via the supply line 14. The sink 12 may have an inlet 12.14 connected to the supply line 14 and an outlet 12.16 connected to the return line 16.

The tank 8 may be connected to the return line 16 such that return water may flow from the sinks 10, 11 and 12 to the tank 8 via the return line 16. In the present disclosure the term "connected" and its derivatives may be construed as meaning "fluidly connected". The heater and/or tank 8 may be any commercially available heater and/or tank.

The circulation pump 2 may be configured to pump hot water and make it flow from tank 8 via the supply line 14 to sinks 10, 11, 12. Hot water flowing through the inlet 12.14 of sink 12 may be supplied to the user at sink 12 or flown downstream the outlet 12.16 of sink 12 via the bypass valve 4 for domestic hot-water recirculation. The bypass valve 4 may be arranged between, and connected to, the inlet 12.14 and outlet 12.16 of sink 12.

The circulation pump 2 may be controlled to operate in a constant flow in order to protect the elements of system 1 and in compliance with general Domestic Hot Water guidelines for fluid velocity. As the circulation pump 2 may operate in a variable speed setting, its control algorithm may have to handle multiple operation scenarios as the information within the signals differs based on the speed of the circulation pump 2.

The bypass valve 4 may be temperature-controlled (feedback control) in order for hot water to immediately or quickly reach a target temperature at sink 12 so as to meet the user's needs. The temperature of hot water at sink 12 may be measured and communicated by a temperature sensor 18. When the user triggers a flow of hot water, hot water may be pumped by circulation pump 2 from the tank 8 to the sink 12 via the supply line 14. Then the user may stop this supply of hot water.

The circulation pump 2 comprises a pump controller 20 configured for controlling a pump motor 22 such that the pump motor 22 is cycling between on-phases and off-phases as depicted hereinafter in relation to FIGS. 3-6B. On-phases may alternate with off-phases.

The pump controller 20 is configured to track at least one operation parameter of the circulation pump 2. The circulation pump 2 may further comprise a sensing component 24, which is configured for measuring the at least one operation parameter of the circulation pump 2. The at least one operation parameter may be tracked or sensed only while the pump motor 22 operates in the on-phases. The sensing component 24 may issue an output signal, which may be representative of or correlated with the at least one measured operation parameter. The at least one operation parameter may be tracked or sensed in the form of a voltage or a current, for example as a 0-10 V signal or as a 4-20 mA current loop. The tracked or sensed output may be representative of or correlated with the at least one measured operation parameter, for example proportional to it.

The circulation pump 2 may further comprise a memory 26 for storing and retrieving input data like instructions, programs, measures etc. The pump controller 20 may be linked with the memory 26 to retrieve stored data.

The circulation pump 2 may further comprise a pump housing 28 for accommodating components of circulation pump 2. The pump motor 22 may be arranged inside the pump housing 28 or outside it, for example remotely from the pump housing 28. Pump controller 20, sensing component 24 and memory 26 may be arranged inside the pump housing 28 or outside it, for example remotely from the pump housing 28. The circulation pump 2 may further comprise a not-shown impeller, which may preferably be arranged in the pump housing 28 and mechanically coupled to the pump motor 22 for rotation.

The pump controller 20 may be further configured to feedback-control the working speed of the pump motor 22 or the outgoing flow rate of the circulation pump 2. A nominal value for said working speed or said flow rate may be either adaptive or substantially identical in each on-phase. In the illustrated example, the pump controller 20 may feedback-control the working speed of the pump motor 22 such that the outgoing flow rate of the circulation pump 2 is substantially constant.

FIG. 3 illustrates a learning state of pump controller 20, while FIG. 4 illustrates an operating state of pump controller

20. FIG. 3 shows a Power-Time (P-t) graph plotting an electrical power consumption P of the pump motor 22 (hereinafter power) on the vertical axis against time t on the horizontal axis. Similarly, FIG. 4 shows a Power-Time (P-t) graph plotting electrical power consumption P of the pump motor 22 (hereinafter power) on the vertical axis against time t on the horizontal axis. The electrical power consumption P of the pump motor 22 represents the largest part of the electrical power consumption P of the circulation pump 2.

In FIG. 3 the cross-hatched areas show phases where the bypass valve 4 may be open and hot water may flow through it. By contrast, the white, non-cross-hatched areas show phases where the bypass valve 4 may be closed and the flow of hot water through it may be substantially null or very small.

At the beginning of on-phase 31 the power P31 may be relatively small, herein about 25% of the maximal power Pmax. The pump motor 22 may be actually moving hot water through the supply line 14 without working at full speed. Towards the end of on-phase 31 the bypass valve 4 may become progressively closed, so the power may increase as the pressure drop (or flow resistance) increases in supply line 14.

In off-phase 32, the bypass valve 4 is closed, the pump controller 20 may be controlling the pump motor 22 to work at high or full speed to try to overcome the pressure drop (or flow resistance). Since the pressure drop (or flow resistance) in supply line 14 may be large, the consumed power P32 may become large (left part of off-phase 32) and remain so until the pump controller 20 stops the pump motor 22, so the power drops from P32 down to substantially zero towards the end of off-phase 32.

The pump controller 20 is configured such that the on-phase 31 gets terminated and the off-phase 32 gets initiated when an output signal of sensing component 24 indicates that the at least one operation parameter reaches a termination threshold range 35. The pump controller 20 may be further configured for comparing the at least one operation parameter to the termination threshold range 35.

The at least one operation parameter is tracked by the pump controller 20; it may for example be sensed by the sensing component 24. The at least one operation parameter may be selected as the electrical power consumption of the circulation pump 2, which may largely be equated with the electrical power consumption P of the pump motor 22. Alternatively, the at least one operation parameter could be selected as a parameter representative of or correlated with the electrical power consumption P of the circulation pump 2.

The termination threshold range 35 may indicate that the bypass valve 4 is substantially in the closed state, hence that the power may reach a large value P32 within the termination threshold range 35. The pump controller 20 may be further configured for terminating operation of pump motor 22 when the termination threshold range 35 is reached, the pump motor 22 thus passing into the off-phase 32 at substantially null or very small power. As visible in the learning state of FIG. 3 the off-phase 32 may be initiated with a short delay after the bypass valve 4 got closed. This short delay may allow the pump controller 20 to track another operation parameter of the circulation pump 2, for example the working speed of the pump motor 22.

On-phase 33 and off-phase 34 are quite similar to on-phase 31 and off-phase 32, respectively. In on-phase 33 the bypass valve 4 may be opened again, here for a shorter time than on-phase 31. The power may be relatively small like power P31. Hot water may flow through supply line 14, and the pump motor 22 is not working at full speed. Towards the end of on-phase 33 the bypass valve 4 may be closed, so the power may increase as the pressure drop (or flow resistance) increases in supply line 14.

In off-phase 32, the bypass valve 4 is closed, the pump controller 20 may be controlling the pump motor 22 to work at high or full speed to try to overcome the pressure drop (or flow resistance). Since the pressure drop (or flow resistance) in supply line 14 may be large, the consumed power P32 may become large (left part of off-phase 32) and remain so until the pump controller 20 stops the pump motor 22, so the power drops from P32 down to substantially zero towards the end of off-phase 32.

The highest power P34 reached in off-phase 34 after closing of bypass valve 4 may be slightly smaller than the highest power P32 reached in off-phase 32 after closing of bypass valve 4. The pump controller 20 may be configured to learn, in the learning state depicted in FIG. 3, the termination threshold range 37 while the pump motor 22 operates in the on-phases 34. The pump controller 20 may thus adjust or replace the termination threshold that was stored in off-phase 32 to the slightly lower termination threshold range 37. The termination threshold range may be set to include an interval surrounding an actual value of the at least one operation parameter, say at the highest power reached like P32 or P34.

The learning state shown in FIG. 3 may be stopped upon fulfilling a stop criterion. The stop criterion may for example be selected as having the pump motor 22 operating 20 cycles. The stop criterion may be selected such that the pump controller 20 may learn to reliably determine, based on the output measures from sensing component 24, that the bypass valve 4 is in a closed or low-pass state, although the circulation pump 2 may be devoid of means for communicating with the bypass valve.

No data needs to be communicated from, resp. to, the bypass valve 4 to, resp. from, the circulation pump 2. In system 1 the pump controller 20 is configured for controlling the pump motor 22 based on said at least one operation parameter and without communicating with the bypass valve 4. In other words, the circulation pump 2 can autonomously detect when the bypass valve 4 is closed and thus infer when it is open. Thus, the system 1 may be devoid of communication means between the bypass valve 4 and the circulation pump 2, which may reduce the overall material expense.

After the learning state of FIG. 3 the circulation pump 2 may be put in an operating state in FIG. 4, in particular amidst system 1. In FIG. 4 the cross-hatched areas show phases where the bypass valve 4 may be open and hot water may flow through it. By contrast, the white, non-cross-hatched areas show phases where the bypass valve 4 may be closed and the flow of hot water through it may be substantially null or very small.

The pump controller 20 may be configured to initially store both i) a duration for the off-phases 40, 42, 44 and ii) a duration for the on-phases 41, 43. The duration of off-phases 40, 42, 44 may range from 10 minutes to 20 minutes. The duration of on-phases 41, 43 may range from 1 minute to 10 minutes. In the best embodiment currently contemplated the duration of off-phases 40, 42, 44 may be set to about 15 minutes and the duration of on-phases 41, 43 may be set to about 5 minutes. The pump controller 20 may further be configured to keep constant the duration of the on-phase and/or the duration of the off-phase.

In FIG. 4 the pump controller 20 may terminate the on-phase 41 and initiate the off-phase 42 when the at least one operation parameter, herein the power, reaches, towards the end of on-phase 41, the termination threshold range 45 learnt during the learning state of FIG. 3, which indicates that the bypass valve 4 must have likely been closed. In the illustrated example the termination threshold range 45 may be substantially equal to the termination threshold range 37 stored in FIG. 3 after the off-phase 34.

By contrast, the on-phase 43 may be terminated when the duration of 5 minutes has lapsed, as the power does not reach the termination threshold range 45 (high power), which might mean that the bypass valve 4 remains open for more than 5 minutes. Likewise, the off-phases 40, 41, 43 may all be terminated when the duration of 15 minutes has lapsed.

The pump controller 20 may further be configured to store and adjust i) the duration of on-phases 41, 43 and/or the duration of the off-phases 40, 42, 44. For example in the case of on-phase 43 where the bypass valve 4 seems to remain open longer than 5 minutes, the pump controller 20 may adjust to 6 minutes the duration of the future on-phases. In other words, the duration of on-phases and/or of off phases may be adaptive. The adjusting may be performed stepwise with time increments or decrements of e.g. about 1 minute.

Besides, the pump controller may further be configured to keep on learning, hence adjusting, the termination threshold value or range also during the operating phase. This continuous or permanent learning may allow to increase the precision as a larger statistical sample is used to determine the termination threshold value or range.

Figures 5A, 5B, 6A, 6B:
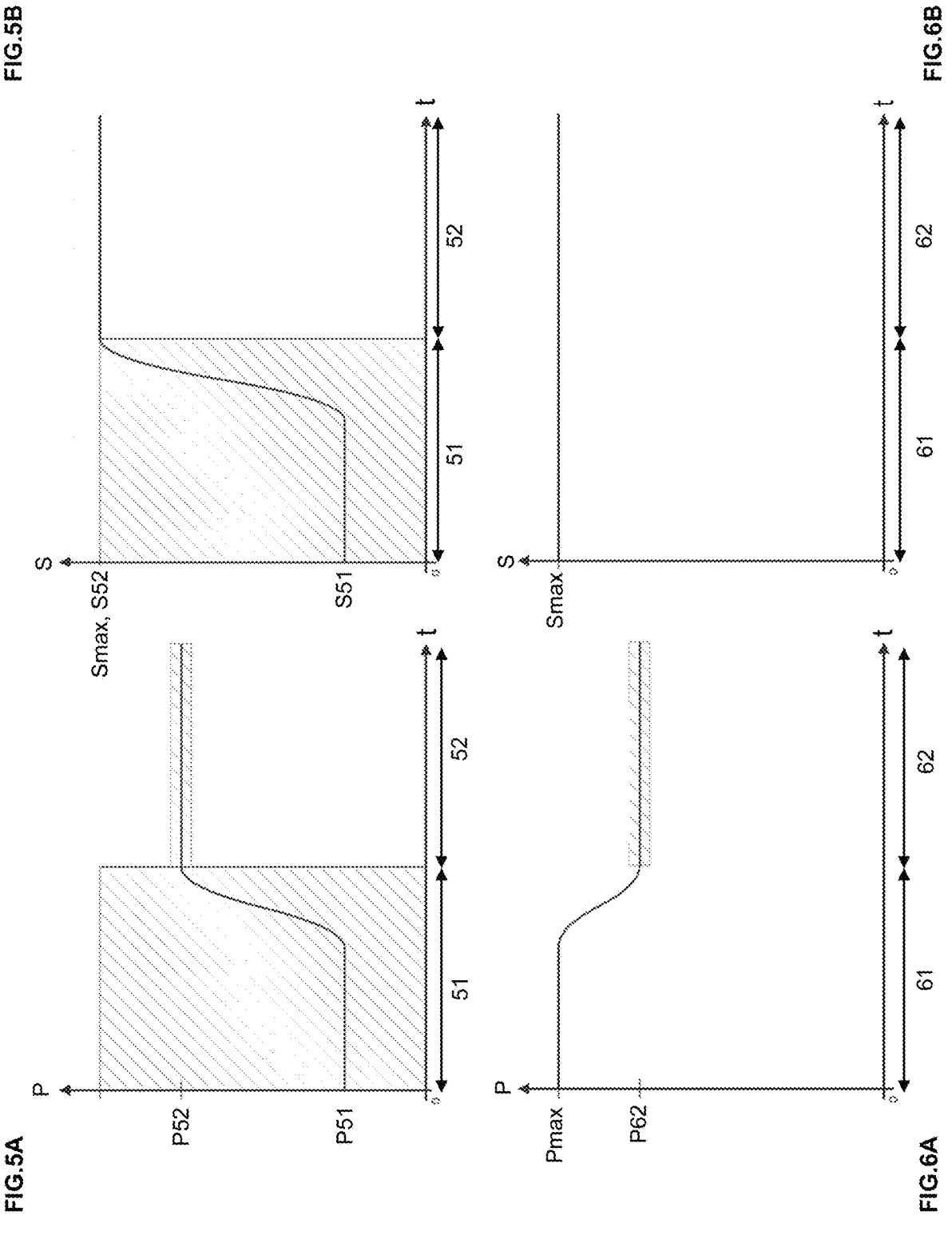
FIG. 5A and FIG. 5B are respectively schematic power-time and speed-time graphs showing a typical working state where the pump motor of FIG. 1 is working at maximum speed and the outgoing flow rate becomes null.
FIG. 6A and FIG. 6B are respectively schematic power-time and speed-time graphs showing a rather unusual working state where the pump motor of FIG. 1 is working at maximum speed and the circulation pump fails to supply the requested flow rate.

FIG. 5A and FIG. 5B show schematic Power-Time (P-t) and Speed-Time (S-t) graphs of a working state where the pump motor 22 is working at maximum speed and the outgoing flow rate becomes null. This working state of circulation pump 2 looks similar to the on-phase 31 and off-phase 32 of FIG. 3. The cross-hatched areas show a phase where the bypass valve 4 may be open and hot water may flow through it. By contrast, the white, non-cross-hatched areas show a phase where the bypass valve 4 may be closed and the flow of hot water through it may be substantially null or very small.

The pump controller 20 may be configured to track two operation parameters of the circulation pump 2: the working speed S of the pump motor 20 in addition to the electrical power consumption of the pump motor 20.

At the beginning of on-phase 51 the power P51 and the speed S51 may be relatively small with respect to Pmax and Smax, respectively. At the end of on-phase 51 the bypass valve 4 may be closing. As the pressure drop (or flow resistance) increases, the power and speed of pump motor 22 may increase up to a highest power P52 and a highest speed S52 which may be equal to Smax. So the pump controller 20 may determine that the termination threshold range is reached by the power P. The on-phase 51 may be terminated and the off-phase 52 initiated.

In addition to the electrical power consumption of pump motor 22, the pump controller 20 may use the speed of pump motor 22 as additional data to improve the accuracy of the determination of the time when the bypass valve 4 is closed. The pump controller 20 may be further configured such that an on-phase is terminated and an off-phase is initiated when also the working speed S reaches a respective termination threshold value or range, for example Smax.

In the working state illustrated in FIG. 5A-5B, the circulation pump 2 may be running at a reduced speed S51 as the pump motor 22 is feedback-controlled based on the outgoing flow rate. This working state may occur in case the system 1 is so designed that the circulation pump 2 can deliver more than a specified flow target. In this case the highest power P52 may be attained in off-phase 52 when the pump motor 22 has reached its maximum speed S52 and the circulation pump 2 is running with no flow (closed bypass valve).

FIG. 6A and FIG. 6B are respectively schematic Power-Time (P-t) and Speed-Time (S-t) graphs showing a less usual working state where the circulation pump 2 fails to supply a specified flow target despite the pump motor 22 running at maximum speed Smax. This might be due to a particularly high pressure drop or flow resistance in the supply line 14 and/or return line 16.

In this case the highest power Pmax may be reached in an on-phase 61 when the circulation pump 2 is running with a lower flow than specified. When the bypass valve 4 is closed in an off-phase 62, the power may decrease to a lower level P62 while the pump motor 22 may still be working at highest or maximum speed Smax. In FIG. 6A the highest power P62 may be reached "from above" (i.e. decreasing), when the bypass valve 4 gets closed, by contrast to the curves of FIGS. 5A-5B or FIG. 4 where a highest power P32, P34 may be reached "from below" (i.e. increasing).

In use the system 1 for domestic hot-water recirculation may be operated in accordance with the method 100 depicted hereinafter in relation to FIG. 7. The method 100 comprises 102) implementing the circulation pump 2 and the temperature-controlled bypass valve 4 and connecting these to supply line 14, sink 12 and return line 16. The method 100 further comprises 104) implementing the sensing component 24 for measuring at least one operation parameter of the circulation pump 2, for example a termination threshold value or range.

The method 100 further comprises:

106) opening or closing the bypass valve 4 based on a temperature of hot water at the hot water inlet 12.14, and 108) controlling the pump motor 2 to cycle between on-phases and off-phases based on said at least one operation parameter and without communication between the circulation pump 2 and the bypass valve 4.

The method 100 may further comprise:

110) the pump controller 20 terminates an on-phase and initiates an off-phase when the at least one operation parameter, e.g. the electrical power consumption of the circulation pump 2, reaches a termination threshold value or range.

In accordance with the method 100, the pump controller 20 may be configured such that an on-phase is terminated and an off-phase is initiated when said at least one operation parameter reaches a termination threshold value or range.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

The invention claimed is:

1. A circulation pump for supplying hot water to a hot water inlet of a temperature-controlled bypass valve for domestic hot-water recirculation, the circulation pump comprising a pump controller configured for controlling a pump motor such that the pump motor cycles between on-phases and off-phases, the pump controller being configured to track at least one operation parameter of the circulation pump; and the pump controller being configured such that an on-phase is terminated and an off-phase is initiated when said at least one operation parameter reaches a termination threshold value or range, wherein the pump controller is configured to learn, in a learning state, the termination threshold value or range while the pump motor operates in the on-phases, and wherein, during an operating state occurring after the learning state, the pump controller terminates the on-phases and initiates the off-phases when said at least one operation parameter reaches the termination threshold value or range learnt during the learning state.

2. The circulation pump of claim 1, wherein the pump controller is further configured for comparing said at least one operation parameter to said termination threshold value or range.

3. The circulation pump of claim 1, wherein the pump controller is configured to track the at least one operation parameter at least while the pump motor operates in the on-phases.

4. The circulation pump of claim 1, wherein the termination threshold value or range indicates that the bypass valve is substantially in a closed state.

5. The circulation pump of claim 1, wherein the at least one operation parameter includes at least the electrical power consumption of the circulation pump or a parameter representative of or correlated with the electrical power consumption of the circulation pump.

6. The circulation pump of claim 1, wherein the pump controller is configured to track more than one operation parameter of the circulation pump, the pump controller being configured such that an on-phase is terminated and an off-phase is initiated when each operation parameter reaches a respective termination threshold value or range.

7. The circulation pump of claim 1, wherein the learning state is stopped upon fulfilling a stop criterion selected within the group consisting of:
the pump motor has operated at least 10 cycles,
the pump motor has operated at least for 10 days, and
the series of termination threshold values or ranges learnt is converging into a window smaller than or equal to a predetermined window.

8. The circulation pump of claim 1, wherein the pump controller is configured to initially store at least one of i) a duration of an off-phase ranging from 10 minutes to 20 minutes and ii) a duration of an on-phase of ranging from 1 minute to 10 minutes.

9. The circulation pump of claim 1, wherein the pump controller is configured to store and adjust at least one of i) the duration of an on-phase and ii) the duration of an off-phase.

10. The circulation pump of claim 1, wherein the pump controller is further configured to feedback-control the working speed of the pump motor or the outgoing flow rate of the circulation pump, a nominal value for said working speed or said flow rate being either adaptive or substantially identical in each on-phase.

11. The circulation pump of claim 10, wherein the pump controller feedback-controls the working speed of the pump motor such that the outgoing flow rate of the circulation pump is substantially constant.

12. The circulation pump of claim 1, wherein the circulation pump is devoid of means for communicating with the bypass valve.

13. A system for domestic hot-water recirculation comprising:

a circulation pump for supplying hot water, and a temperature-controlled bypass valve having a hot water inlet fluidly connected to said circulation pump, at least one operation parameter of the circulation pump being tracked, the circulation pump further comprising a pump controller configured for controlling a pump motor such that the pump motor cycles between on-phases and off-phases, and the pump controller being configured for controlling the pump motor based on said at least one operation parameter and without communicating with the bypass valve, wherein the pump controller is further configured to learn, in a learning state, the termination threshold value or range while the pump motor operates in the on-phases, and wherein, during an operating state occurring after the learning state, the pump controller terminates the on-phases and initiates the off-phases when said at least one operation parameter reaches the termination threshold value or range learnt during the learning state.

14. The system of claim 13, wherein the pump controller is configured such that an on-phase is terminated and an off-phase is initiated when said at least one operation parameter reaches a termination threshold value or range.

15. The system of claim 13, wherein the pump controller is further configured to store and adjust at least one of i) the duration of the on-phase and ii) the duration of the off-phase.

16. The system of claim 13, wherein the pump controller is further configured to keep constant at least one of i) the duration of the on-phase and ii) the duration of the off-phase.

17. A method for operating a domestic hot-water recirculation system comprising a circulation pump and a temperature-controlled bypass valve, the bypass valve having a hot water inlet fluidly connected to said circulation pump, the circulation pump comprising a pump motor configured to cycle between on-phases and off-phases, the circulation pump further comprising a sensor for measuring at least one operation parameter of the circulation pump, the method comprising:

opening or closing the bypass valve based on a temperature of hot water at the hot water inlet, and controlling the pump motor to cycle between on-phases and off-phases based on said at least one operation parameter and without communication between the circulation pump and the bypass valve, wherein the circulation pump further comprises a pump controller that is configured to learn, in a learning state, the termination threshold value or range while the pump motor operates in the on-phases, and wherein, during an operating state occurring after the learning state, the pump controller terminates the on-phases and initiates the off-phases when said at least one operation parameter reaches the termination threshold value or range learnt during the learning state.

18. The method of claim 17, wherein the circulation pump further comprises a pump controller, the pump controller being configured such that an on-phase is terminated and an off-phase is initiated when said at least one operation parameter reaches a termination threshold value or range.

19. A circulation pump for supplying hot water to a hot water inlet of a temperature-controlled bypass valve for domestic hot-water recirculation, the circulation pump comprising a pump controller configured for controlling a pump motor such that the pump motor cycles between on-phases and off-phases, the pump controller being configured to track at least one operation parameter of the circulation pump; and the pump controller being configured such that an on-phase is terminated and an off-phase is initiated when said at least one operation parameter reaches a termination threshold value or range, wherein the pump controller determines, during a learning state, the termination threshold value or range based on the at least one tracked operation parameter, and wherein the pump controller controls, during an operating state, the pump motor based on the termination threshold value or range learnt during the learning state.

20. A system for domestic hot-water recirculation comprising:

a circulation pump for supplying hot water, and a temperature-controlled bypass valve having a hot water inlet fluidly connected to said circulation pump, at least one operation parameter of the circulation pump being tracked, the circulation pump further comprising a pump controller configured for controlling a pump motor such that the pump motor cycles between on-phases and off-phases, and the pump controller being configured for controlling the pump motor based on said at least one operation parameter and without communicating with the bypass valve, wherein the pump controller determines, during a learning state, the termination threshold value or range based on the at least one tracked operation parameter, and wherein the pump controller controls, during an operating state, the pump motor based on the termination threshold value or range learnt during the learning state.

21. A method for operating a domestic hot-water recirculation system comprising a circulation pump and a temperature-controlled bypass valve, the bypass valve having a hot water inlet fluidly connected to said circulation pump, the circulation pump comprising a pump motor configured to cycle between on-phases and off-phases, the circulation pump further comprising a sensor for measuring at least one operation parameter of the circulation pump, the method comprising:

opening or closing the bypass valve based on a temperature of hot water at the hot water inlet, and controlling the pump motor to cycle between on-phases and off-phases based on said at least one operation parameter and without communication between the circulation pump and the bypass valve, wherein the pump controller determines, during a learning state, the termination threshold value or range based on the at least one tracked operation parameter, and wherein the pump controller controls, during an operating state, the pump motor based on the termination threshold value or range learnt during the learning state.

* * * * *